Nov. 18, 1924.  J. F. O'CONNOR  1,515,877
HAND BRAKE
Filed Dec. 14, 1922
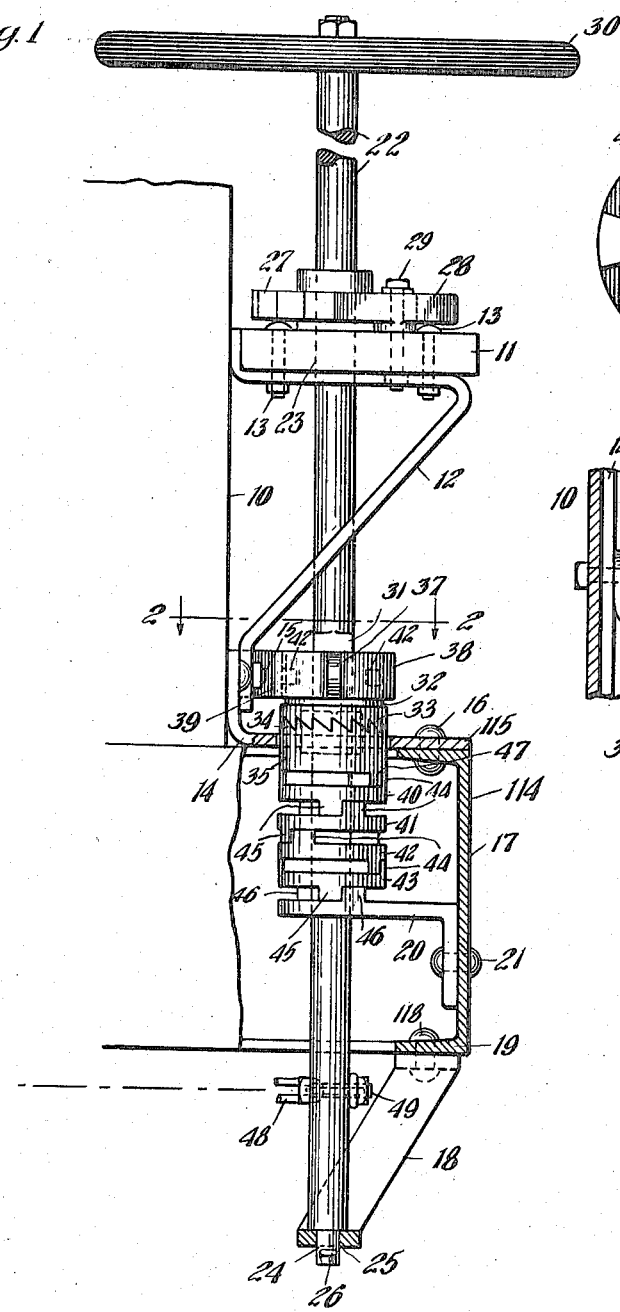
Witnesses
Wm. Geiger
Inventor
John F. O'Connor
By Geo. I. Haight
his Atty.

Patented Nov. 18, 1924.

1,515,877

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

HAND BRAKE.

Application filed December 14, 1922. Serial No. 606,927.

*To all whom it may concern:*

Be it known that I, JOHN F. O'CONNOR, a citizen of the United States, residing at Chicago, in the county of Cook and State of Illinois, have invented a certain new and useful Improvement in Hand Brakes, of which the following is a full, clear, concise, and exact description, reference being had to the accompanying drawings, forming a part of this specification.

This invention relates to improvements in hand brakes.

The object of my invention is to provide a hand brake for railway cars, wherein the revolutions of the brake staff necessary to tighten the brakes are limited to a predetermined number and wherein all increase in slack of the brake chain, due to wearing away of the brake shoe faces, is compensated for automatically so that the number of turns of the staff necessary to tighten the brakes always remains substantially constant.

A more specific object of the invention is to provide a device of the type specified with a lost motion stop means for limiting to a predetermined number of revolutions, the brake staff in tightening up the brakes, together with an adjusting means between the brake staff and the lost motion stop means which compensates automatically for any increase in the slack of the brake chain due to the wearing of the brake shoe faces during service.

In the drawings forming a part of this specification, Figure 1 is a side elevation of a hand brake of the vertical staff type showing my improvements in connection therewith, with parts broken away and in section; Fig. 2 is a horizontal sectional view taken substantially on the line 2—2 of Fig. 1; and Fig. 3 is a plan view of one of the stop collars.

In said drawings, 10 indicates the end wall of a car, said wall being provided with platform 11 supported by a bracket 12 suitably secured to the former by bolts 13 and secured to the end wall of the car, and the upper beam 14 of a built-up end sill 114, by any suitable means, such as bolts 15. The beam 14 is of right angular shape in cross-section, having a horizontally arranged portion 115 to which is secured by rivets or other suitable means 16, channel beam 17, forming the side of the end sill 114. A stirrup 18 is suitably secured to the flange 19 of the channel beam 17 by means of rivets 118. A right angular stop bracket 20 is secured between the upper and lower ends of the beam 17 by means of rivets 21.

A brake staff 22 is journaled within the platform 11, as indicated at 23 and has its lower end reduced as shown at 24 and journaled within a suitable bearing opening 25 in the stirrup 18 and is held in position by the cotter-pin 26. The brake staff 22 is also journaled within the bracket 20. The brake staff is provided with the usual ratchet member 27 and a co-acting, foot controlled pawl of a common and well known construction, the pawl 28 being pivoted to the patform 11 by means of the bolt 29. The upper end of the brake staff is provided with the usual hand wheel 30 rigidly secured thereto in any suitable manner so as to rotate the same. Between its ends the staff 22 is provided with a squared portion 31 upon which is vertically slidably mounted for rotation therewith, an upper clutch member 32 provided with teeth 33 on its lower face co-acting with teeth 34 on a lower clutch member 35 rotatably journaled upon the staff 22 and having a rotary bearing in the bracket 20. The upper end portion of the clutch member 32 is slightly reduced and provided with a peripheral groove 36. The co-acting teeth 33 and 34 on the clutch members 32 and 35 are so arranged that relative rotation of the latter in a counter clockwise direction will be prevented. The inclination of the teeth 33 and 34 is such that when the brake staff is rotated in a clockwise direction, the resistance offered between the co-acting teeth will normally be sufficient to rotate the clutch member 35 in unison with the clutch member 32, but upon a predetermined resistance being encountered by the clutch member 35, the clutch member 32 will be permitted to slip relative to the member 35 for the purpose hereinafter described.

Manual means is provided to disengage the clutch members 32 and 35, said means comprising a shipper lever 37 forked as shown at 38 and 39, the portion 39 being extended beyond the end of the corresponding forked portion 38 as indicated at 40 and offset relative to the portion 39 and pivoted by means of a bolt 41 to the end wall 10 of the car and the bracket 14. The forked end of the lever 37 is provided with inwardly projecting oppositely located lugs 42 engaging within the peripheral recess 36 of the upper clutch member 32, whereby, upon manipulation of the lever, the clutch member 32 may be withdrawn from engagement with the clutch member 35.

The lost motion connection stop means comprises a plurality of discs or collars 40, 41, 42 and 43, interposed between the clutch member 35 and the stop bracket 20, said discs or collars being rotatably journaled upon the staff 22, so as to have rotation relative to each other. Each of the discs or collars 40, 41, 42 and 43 is provided with radially arranged upwardly projecting oppositely located stop lugs 44 and downwardly projecting similarly arranged stop lugs 45. The stop lugs 44 and 45 on opposite sides of the discs or collars are so arranged that each pair of lugs is spaced 180° apart and the pairs on opposite sides of the discs are spaced 90° apart relative to each other. As clearly shown in Fig. 1, the stop lugs 45 of each of the discs or collars 40, 41, 42 and 43 are adapted to co-act and engage with the stop lugs 44 projecting upwardly from the next lower disc in the series. The stop lugs 45 on the lowermost disc 43 of the series are adapted to co-act with upwardly projecting stop lugs 46 on the stop bracket 20, and thereby limit the rotation of the disc 43 in both a clockwise and counter-clockwise direction. The clutch member 35 is provided with a downwardly projecting pair of lugs 47 spaced similarly to the lugs 45 on the discs or collars and the same are adapted to engage with the lugs 44 projecting upwardly from the uppermost disc 40 of the series.

The brake chain 48 has one end suitably secured to the brake staff 22 by means of a bolt 49 passing through the brake staff and last link of the chain, said chain being adapted to be wound upon the lower end portion of the staff. The opposite end of the chain 48 is suitably secured to the brake mechanism.

In the operation of the improved hand brake herein shown, upon rotation of the hand wheel and the brake staff 22 in a clockwise direction, the brake chain 48 will be wound upon the lower end of the staff. During this operation, the clutch member 32 will rotate with the staff 22 and through the frictional engagement between the teeth 33 and 34, will rotate clutch member 35 in a clockwise direction, thereby bringing the lugs 47 in engagement with the lugs 44 on the upper disc 40 of the series. The disc 40 will then be rotated with the clutch member 35 bringing the lugs 45 of the disc 40 into engagement with the lugs 44 of the disc 41, whereupon the latter will rotate in unison therewith, bringing the lugs 45 thereof in engagement with the lugs 44 of the disc 42, whereupon the latter will also be rotated in unison with the discs 40 and 41, and the clutch member 35, bringing the lugs 45 of the disc 42 into engagement with the lugs 44 of the disc 43, causing the same to rotate in unison with the series of discs and the clutch 35 until the lugs 45 on the disc 43 are brought into engagement with the stop lugs 46 on the bracket 20, whereupon rotation of the series of discs and the clutch member 35 will be brought to a stop. When the series of discs and the clutch member 35 have thus been brought to a stop, and assuming that the brake chain has not been completely wound up on the brake staff so as to set the brakes, that is, if any slack remains in the chain, the friction between the teeth 33 and 34 will be overcome and the clutch member 32 will ratchet over the clutch member 35, thus allowing the brakes to be properly tightened and the clutch member 32 to advance relatively to the clutch member 35, and the teeth to re-engage with the clutch parts in relatively different positions to compensate for the increased length of the brake chain. It is, of course, obvious, that when the brake has thus been set, the pawl 28 and ratchet 27 will lock the brakes in tightened position in a usual and well known manner. Upon release of the brakes, during the unwinding of the chain, the staff will be rotated in a counter clockwise direction, and the clutch elements 32, 33 together with the series of discs 40, 41, 42 and 43 will be operated in a manner similar to that heretofore described in connection with the operation of the brakes in a clockwise direction but reversely thereto. This rotation will continue until the lugs 45 on the lower disc 43 engage with the stop lugs 46 on the stop bracket 20, whereupon rotation of the series of discs, clutch members and the brake staff, will be positively arrested.

It will be evident that by the arrangement described, the number of turns of the brake wheel necessary to set the brakes is always kept substantially constant and that as the parts of the brake mechanism and especially the brake shoe faces become worn and the slack in the brake chain is increased due to this wearing of the parts, the adjustable clutch members 33 and 35 will automatically compensate for the same.

The lever 37 provides manual means for disengaging the clutch members 35 and 36 so that full chain slack would be available when applying new brake shoes or wheels. After replacement of parts, the first application of the brakes would automatically re-adjust the slack as originally provided.

I have herein shown and described what I now consider the preferred manner of carrying out the invention, but the same is merely illustrative and I contemplate all changes and modifications that come within the scope of the claims appended hereto.

I claim:

1. In a hand brake; the combination with a rotary brake staff; adapted to have a brake chain wound thereon; of means for limiting the revolutions thereof in one direction to substantially a predetermined number; and means automatically operative to disconnect said staff and first named means when the staff is rotated in the reverse direction.

2. In a hand brake; the combination with a rotatable brake staff; adapted to have one end of a brake chain secured thereto; of means for limiting the rotation of the same to a predetermined plurality of revolutions; and automatically operated adjusting means between said first named means and the brake staff, whereby variable amounts of increased slack in the brake chain is compensated for.

3. In a hand brake; the combination with a brake staff, said staff being rotatable in opposite directions to wind and unwind the chain; of means having limited rotation in opposite directions for positively limiting the rotation of said staff in one direction after more than one revolution; and an adjustable connection between said means and the brake staff whereby increased slack in the brake chain is compensated for by permitting the necessary additional winding of said chain.

4. In a hand brake; the combination with a brake staff, said staff being rotatable in opposite directions to wind and unwind the chain; of means having limited rotation in opposite directions for limiting the rotation of said staff in an unwinding direction; an adjustable clutch mechanism between said means and said staff, said clutch mechanism being automatically operative, upon rotation of said staff in a winding direction, to disconnect the staff and said means to permit further winding movement of said staff to compensate for increased slack in the brake chain; and manually operative means for disconnecting said clutch and said means.

5. In a hand brake; the combination with a rotary brake staff; a plurality of discs rotatably journaled on said staff, said discs having interengaging stops; a fixed stop member adapted to co-act with one of said discs to limit the rotation thereof; a clutch member fixed to said staff to rotate in unison therewith; and a co-acting clutch member rotatably journaled on said staff, said second named clutch member and one of said discs having interengaging stops.

6. In a hand brake; the combination with a brake staff, said staff being rotatable in reverse directions to wind and unwind the brake chain; a series of discs rotatably journaled on said staff, said discs having interengaging stops to limit the relative rotation thereof; a stop member positively limiting the rotation of the disc at one end of the series; and a connection between the disc at the other end of the series and the staff, said connection being automatically adjustable relative to said brake staff to compensate for increased slack in the brake chain when the staff is rotated in a direction to wind the chain.

7. In a hand brake; the combination with a brake staff, said staff being rotatable in reverse directions to wind and unwind the brake chain; a series of discs rotatably journaled on said staff, said discs having interengaging stops to limit the relative rotation thereof; a stop member positively limiting the rotation of the disc at one end of the series; and a clutch element, comprising members provided with interengaging teeth, one of said members being mounted for rotation in unison with said staff and the other being rotatable relative to said staff, said last named member having a stop co-acting with the disc at the other end of the series to limit the relative rotation of said last named disc and second named stop member, the teeth of said clutch member being so arranged as to automatically disengage to permit adjustment of said staff relative to said series of discs whereby to compensate for increased slack in the brake chain when the staff is rotated in a direction to wind the chain.

8. In a hand brake; the combination with a brake staff, said staff being rotatable in reverse directions to wind and unwind the brake chain; a series of discs rotatably journaled on said staff, said discs having interengaging stops to limit the relative rotation thereof; a stop member positively limiting the rotation of the disc at one end of the series; a connection between the disc at the other end of the series and the staff, said connection being automatically adjustable relative to said brake staff to compensate for increased slack in the brake chain when the staff is rotated in a direction to wind the chain; and means for manually disengaging said connecting member.

9. In a hand brake; the combination with a brake staff reversely movable in two directions for tightening and slackening the brakes; of means for positively limiting the movement of said staff after a pre-determined movement in a brake slackening direction, said means including a connecting clutch element movable on said staff and automatically operative upon movement of said staff in a tightening direction to disconnect said staff and said means to permit further winding movement of said staff so as to compensate for increased slack in the brake chain.

10. In a hand brake; the combination with a rotatable member adapted to wind and unwind a brake chain; a means for rotating said member; of devices associated with said member for automatically maintaining a substantially constant amount of slack in the brake chain; and a manually operable means for temporarily rendering said devices inoperative to thereby render the maximum amount of chain slack available.

In witness that I claim the foregoing I have hereunto subscribed my name this 27th day of October, 1922.

JOHN F. O'CONNOR.

Witnesses:
H. M. DEAMER,
FRANCES SAVAGE.